A. BABENDREER.
MULCH HOE.
APPLICATION FILED OCT. 28, 1914.
1,175,860.
Patented Mar. 14, 1916.
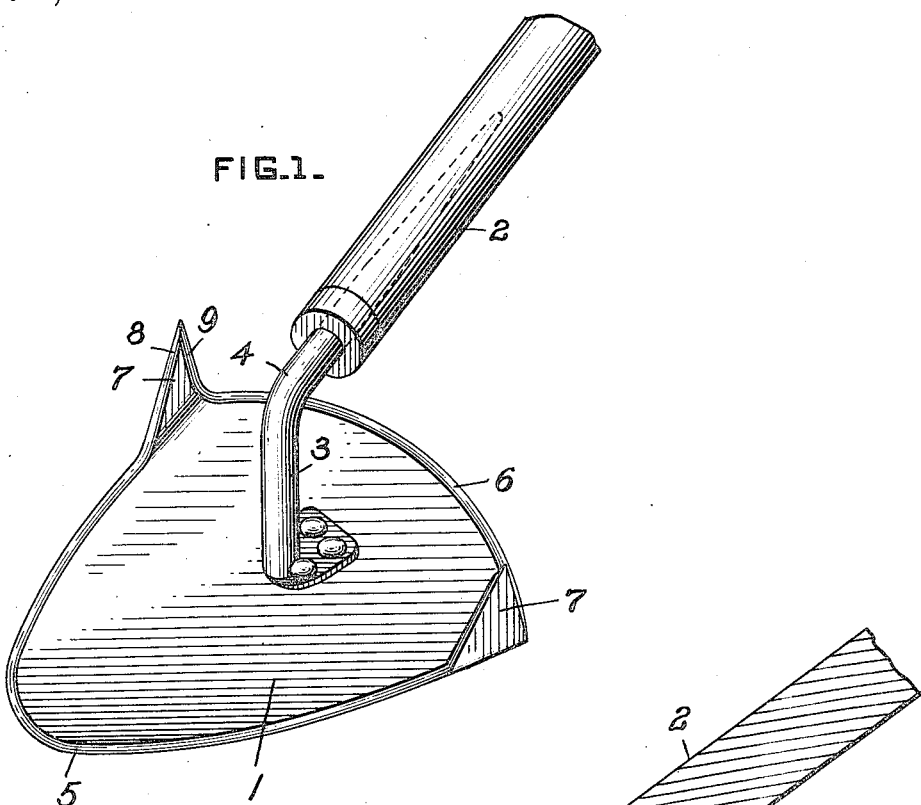
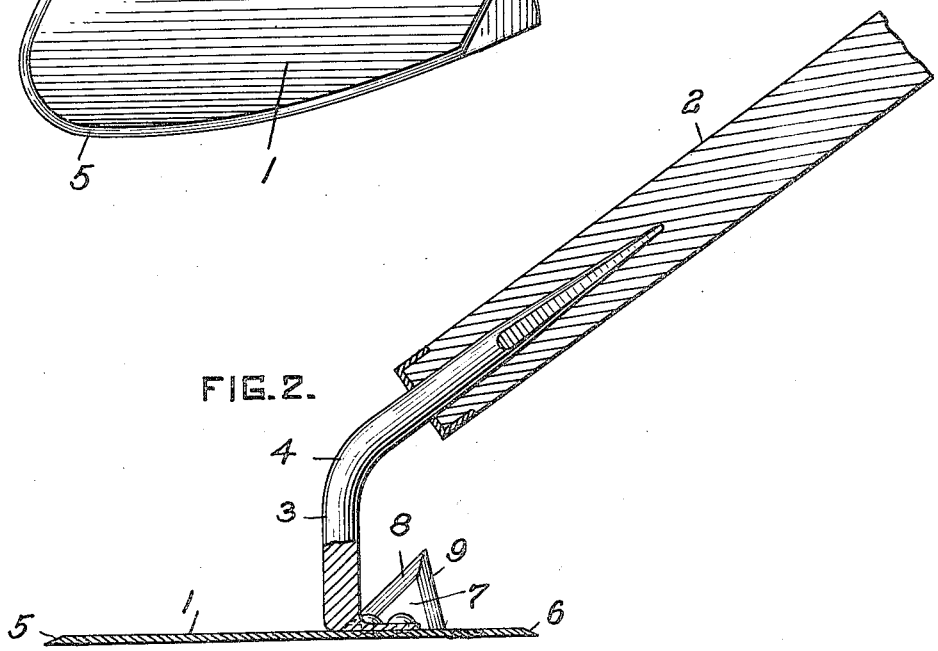

UNITED STATES PATENT OFFICE.

ALBERT BABENDREER, OF OCEAN SPRINGS, MISSISSIPPI.

MULCH-HOE.

1,175,860.

Specification of Letters Patent.

Patented Mar. 14, 1916.

Application filed October 28, 1914. Serial No. 868,992.

*To all whom it may concern:*

Be it known that I, ALBERT BABENDREER, residing at Ocean Springs, in the county of Jackson and State of Mississippi, a citizen of the United States, have invented or discovered certain new and useful Improvements in Mulch-Hoes, of which improvements the following is a specification.

My invention relates to what are known as "mulch" hoes, which comprise a flat blade secured to a handle at such an angle that, as the hoe is moved forwardly and backwardly by a workman, the blade may be slightly below and parallel to the surface of the ground. The blade has its edges sharpened and cuts, just below the surface of the ground, weeds, grass and other undesirable vegetation, forming a mulch of the same with the slightly disturbed earth. Hoes of this type, although useful for various purposes, are particularly well adapted to work the ground around trees or bushes, which, either because of their low hanging branches or surface feeding roots, do not permit of the chopping action of the ordinary garden hoe.

It is the object of my invention to provide a mulch hoe which may be effectively operated with a minimum expenditure of energy, and which may be used near the trunks of trees or stalks of bushes without liability of cutting them.

A further object of my invention is to provide such hoes with means for indicating to the workman the width of the cutting swath, and with means for overcoming the tendency of such hoes to come to, and ride upon, the surface of the ground.

In the accompanying sheet of drawings, which form part of my specification, and in which I have illustrated an embodiment of my invention, Figure 1 is a perspective view, and Fig. 2 a longitudinal central sectional view of the hoe.

The hoe, as far as its general construction is concerned, comprises a substantially flat blade 1 having all of its edges sharpened and a handle 2 secured to the upper face of the blade. While the handle may be attached in any suitable manner, it is preferable that such attachment be made at a point intermediate of the toe and heel of the blade. Also, to prevent as far as possible the gathering of weeds and grass around the handle, and further to facilitate a change of inclination of the blade by raising or lowering the handle, a stem 3 projects perpendicularly from the blade to such a height as may be found most advantageous. The stem is bent, as at 4, and the handle secured to its outer end in any suitable manner. The angle at which the handle is secured to the blade is such that a workman, standing in a substantially erect position, may readily move the blade parallel to the surface of the ground.

One feature of my invention concerns the shape of the cutting edges of the blade. It will be readily understood that more exertion, on the part of a workman, is required to push the hoe forwardly than to draw it rearwardly. I have found that the resistance to the forward movement may be materially diminished, without unduly sacrificing the cutting action of the hoe, by forming the toe 5 in the form of an ellipse having its long axis extending from the front to the rear of the blade. Also, I have found that the maximum efficiency in the rearward, or pulling stroke, is attained when the heel 6 of the blade is in the form of an outwardly extending arc of a circle, as clearly seen in Fig. 1.

Because, in the manipulation of hoes of this type, the blade is hidden from the workman's view, it frequently happens that stocks or trunks of trees are cut or otherwise injured by the lateral extremities of the blade. To overcome this difficulty I provide means for indicating the width of the swath being cut, such means consisting preferably of markers in the form of upwardly extending flanges 7. The markers, being at the outer extremities of the blade, project through the surface of the ground and are visible to the workman.

A further feature of my invention has to do with maintaining the blade below the surface of the ground. In the usual forms of hoes of the type contemplated by my invention there is a tendency for the blade to ride-up to the surface of the ground. This tendency is more pronounced in the forward than the rearward strokes. To overcome it I provide means to cause the earth above the blade to direct the blade downwardly as it is moved through the ground. Such means may be afforded by a particular configuration of the markers or upwardly turned flanges 7. For this purpose, in the present embodiment of my invention, the flanges extend perpendicularly from the upper face of the blade, and the edges of the flanges, which are preferably sharpened, are so inclined that, as the blade is moved through the ground, the ground will exert a downward pressure upon the flanges. As will be seen in Fig. 2, the flange edge 8 inclines rearwardly and the edge 9 forwardly. This downwardly-directing action of the flanges is augmented by the faces of the flanges, which lie in intersecting, rather than parallel, planes perpendicular to the general plane of the blade, and are wider at the base than at the top.

I claim as my invention:

A mulch hoe comprising a flat blade having sharpened toe and heel edges, the former being elliptical in shape and the latter extending outwardly in the arc of a circle, the lateral edges of the blade being provided with upwardly extending sharpened flanges, and a handle secured to the blade at a point equally distant from said flanges but nearer to the rearmost point of the heel than to the tip of the toe.

In testimony whereof I have hereunto set my hand.

ALBERT BABENDREER.

Witnesses:
B. F. JOACHIM, Sr.,
C. H. WOODWARD.